April 3, 1951     W. S. COOK     2,547,857
LUBRICANT FILTER
Filed Nov. 10, 1947     2 Sheets—Sheet 1
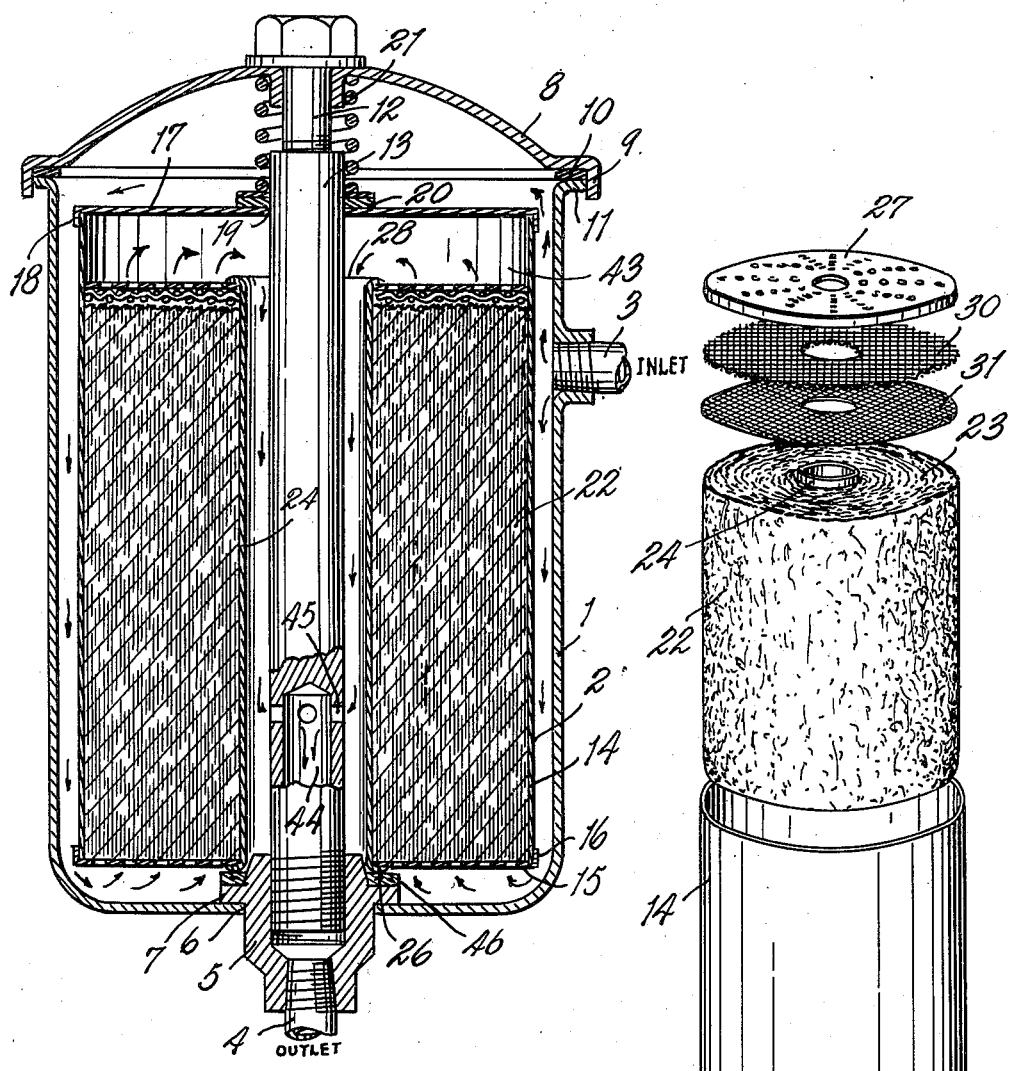
FIG. 1
FIG. 3
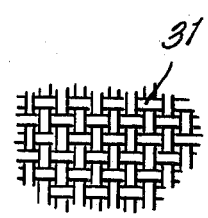
FIG. 4
FIG. 2
INVENTOR.
Wayne S. Cook
BY
Attorney.

April 3, 1951  W. S. COOK  2,547,857
LUBRICANT FILTER
Filed Nov. 10, 1947  2 Sheets-Sheet 2

INVENTOR.
Wayne S. Cook
BY
Attorney.

Patented Apr. 3, 1951

2,547,857

UNITED STATES PATENT OFFICE 2,547,857

LUBRICANT FILTER

Wayne S. Cook, Grand Rapids, Mich., assignor to Sackner Products, Inc., a corporation of Michigan Application November 10, 1947, Serial No. 785,031

4 Claims. (Cl. 210—169)

This invention relates to improvements in lubricant filter and method of making.

The main objects of this invention are:

First, to provide a lubricant filter which is highly efficient and at the same time may be economically produced.

Second, to provide a lubricant filter which retains its efficiency for a relatively long period of time and is not subject to compaction in zones or portions thereof as a result of lubricant being forced through the filter under pressure.

Third, to provide a method of manufacturing filters embodying these advantages which not only enables the economical production of the filter but results in great uniformity in the product.

Objects relating to details and economies of the invention will definitely appear from the description to follow. The invention is defined in the claims.

A structure which embodies the features of the invention is clearly illustrated in the accompanying drawing, in which:

Fig. 1 is a fragmentary view mainly in vertical section of a lubricant filter embodying my invention adapted for use in an internal combustion engine.

Fig. 2 is an exploded perspective view of the elements of the filter cartridge.

Fig. 3 is a fragmentary perspective view of the preferred form of filtering material, namely, multi-ply cellulose tissue.

Fig. 4 is a fragmentary perspective view of one of the filtering body cover elements.

Figure 5:
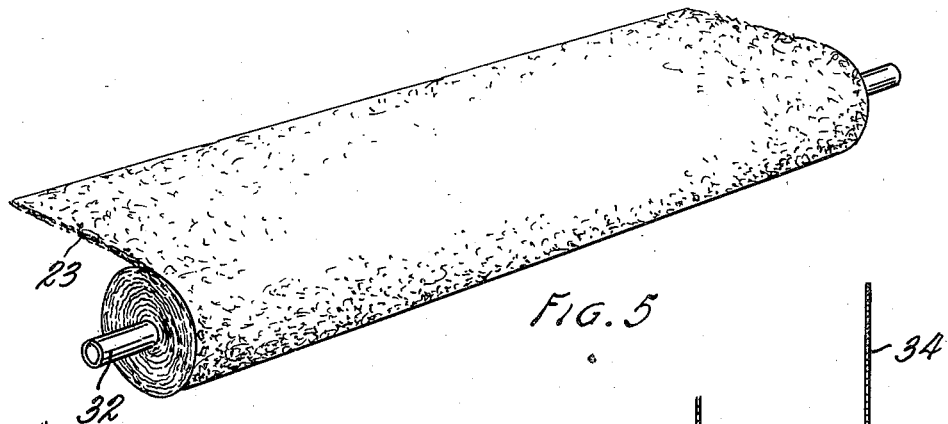
Fig. 5 is a perspective view illustrating one of the steps of my improved method, the sheet of filtering material being conventionally illustrated.
Figure 6:
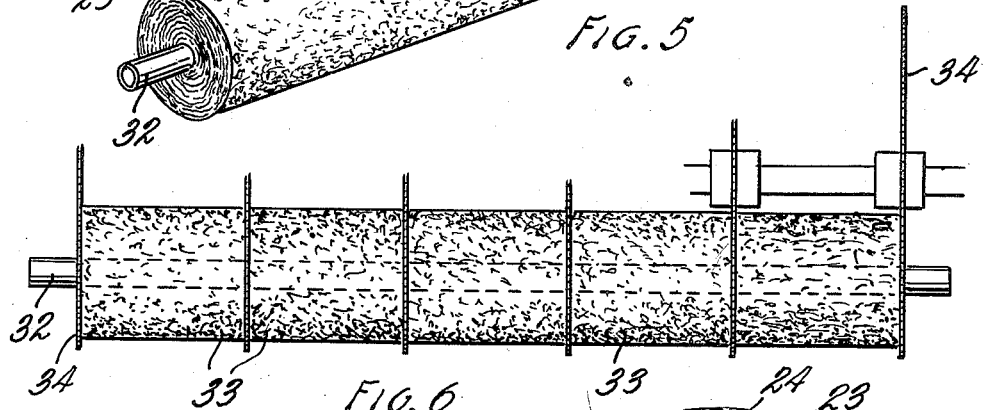
Fig. 6 is a fragmentary plan view illustrating another step in the method.
Figure 7:
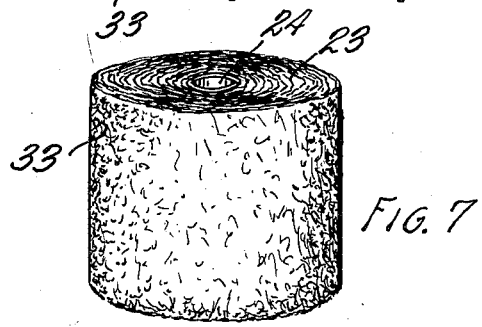
Fig. 7 is a perspective view of one of the filtering body sections with the tube therein.
Figure 8:
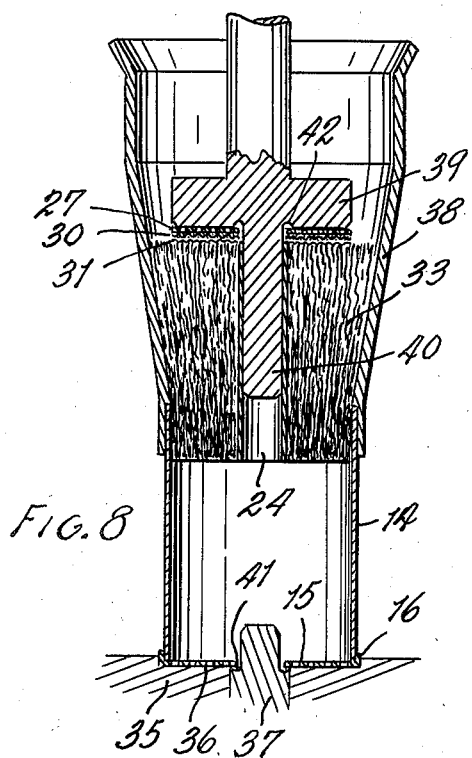
Fig. 8 is a fragmentary view partially in vertical section illustrating the step of inserting the filtering body into the cartridge shell.
Figure 9:
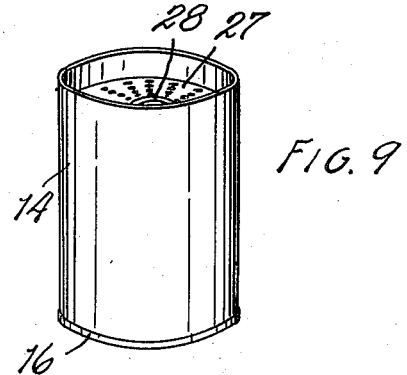
Fig. 9 is a perspective view of the filtering cartridge of the invention with the cover removed.

In the embodiment of the invention illustrated I provide a casing 1 of suitable dimensions to receive the filtering cartridge designated generally by the numeral 2. The casing 1 is provided with a side inlet 3 and a discharge or outlet 4 connected to the coupling fixture 5 which is passed through an opening 6 in the bottom of the casing and provided with a flange 7 engaging the inner side of the bottom. The cover 8 is provided with a flange 9 retaining the gasket 10 resting upon the outwardly flanged end 11 of the casing. The screw 12 is threaded into the upper end of the post 13, this post being threaded into the coupling.

The filter unit or cartridge 2 comprises an imperforate cylinder shell 14 having a foraminate bottom 15, the bottom being provided with a flange 16 embracing the lower end of the shell. The shell is provided with an imperforate cover 17 having a flange 18 at its edge embracing the shell wall. The cover is provided with an opening 19 receiving the post, this opening being surrounded by a gasket 20 urged to its seat by the spring 21.

The filtering material 22 consists of multi-ply creped cellulose tissue 23 which is convolutely wound upon the tube 24 and radially compressed to the desired density and forced within the shell. The foraminate bottom 15 is provided with a central opening 25 through which the tube is disposed, the lower end of the tube being upset at 26 into retaining engagement with the bottom 15. The upper end of the tube projects from the filtering body 22 and through the foraminate metal plate 27, the tube being upset at 28 into retaining engagement with the plate 27.

To facilitate the distribution or uniform flow of lubricant through the filtering mass I arrange a screen designated 30 on the inner side of the plate 27, this screen being formed of quite heavy strands of twisted fiber. A fabric disk 31 is arranged on the inner side of the screen 30.

In the manufacture of the cartridge I provide an elongated metal tube 32 on which I convolutely wind the filtering material 23. As stated, this is formed of multi-ply creped tissue, a suitable form of which is on the market known as cellulose wadding. This material is wound under substantial tension upon the tube to a diameter substantially greater than the diameter of the filtering body when it is compressed into the shell 14 of the filter cartridge. The tube and the material wound upon the tube are then cut into lengths or sections 33, the sections being somewhat longer than the final filtering body when it is assembled in the cartridge. In the accompanying drawing I illustrate a multiple saw 34 for severing the roll of material into sections and cutting off the projecting end portions of the tube which are used as supporting journals during the winding. The sections 33 with the cartridge tube sections 24 therein are then radially compressed and axially forced into the shell 14 to which the foraminate bottom 15 has been applied. A base or bed member 35 is provided with a seat 36 therein adapted to position the shell relative to the forming die 37.

A feed hopper 38 is provided which has downwardly converging walls adapted at their lower ends to receive the upper end of the cartridge wall or shell 14. A section 33 of the filtering material is placed in this hopper and forced downwardly by means of the plunger 39 having a pilot 40 extending into the tube 24. It should be noted however that before the plunger is engaged with the upper end of the filtering material the filtering body cover parts 27, 30 and 31 are arranged thereon. As the plunger is moved downwardly the filtering body is compressed radially and pushed endwise or axially into the shell and against the bottom 15 thereof. The filtering body is axially compressed somewhat so that the end of the tube passes through the opening 26 in the bottom and is upset or flanged outwardly thereon by means of the upsetting shoulders 41 on the forming die 37. The plunger is provided with upsetting shoulders 42 which engage the upper end of the tube and flange or upset it outwardly into retaining engagement with the foraminate cover plate. The filtering body is upset axially sufficiently to permit the tube to project through the openings in the foraminate bottom and in the cover plate and to be upset thereon.

The perforations are quite uniformly positioned in the bottom and the cover plate, but to provide a complete distribution of the lubricant filtered I provide the fabric 31 and the screen 30 which provides channels within the cover plate. The fabric prevents particles from the filtering body from being carried into the screen or cover plate, which might result in clogging some of the perforations and thus to some degree prevent uniform distribution. The chamber 43 between the top of the filter element and the cartridge cover 17 permits flow of the lubricant through the chamber and downwardly through the tube around the post. The post is provided with a longitudinal passage 44 having lateral openings 45 communicating passage 44 with the tube. A gasket 46 is disposed between the bottom of the cartridge and the flange 7 on the coupling 5. The spring 21 urges the cartridge against this gasket and thus prevents the incoming fluid from flowing upwardly in the tube or to the outlet without passing through the filtering mass. The fluid to be filtered flows axially of the filtering material, which presents a large amount of filtering surface.

The filtering body is uniformly compacted so that the tendency for the fluid under pressure to form channels therein is minimized. The foraminate bottom and the foraminate top both tend to produce uniformity of distribution of material in its flow through the filter.

The filters of this invention may be produced economically and with great uniformity. I have illustrated and described a highly practical embodiment of the invention and the method or steps of producing the same. The filter illustrated is designed for use as a filter for the lubricant of an internal combustion engine, but the filters of this invention are adapted for and have useful advantages in various other types of filters. I have not attempted to illustrate or describe such modifications or adaptations as it is believed this disclosure will enable those skilled in the art to embody or adapt the invention as may be desired.

Having thus described my invention what I claim as new and desire to secure by Letters Patent is:

1. In a filter, the combination of a casing provided with a discharge coupling at its bottom, a post carried by said coupling and having an outlet passage therein opening to said coupling, a filter cartridge comprising a shell having an imperforate side wall and a foraminate bottom, a top on said shell forming a central hole with an annular seal therearound coacting with said post, an imperforate tube surrounding and spaced from said post and having its lower end disposed through said shell bottom and upset in retaining engagement therewith, the post passage opening within said tube, a filtering body consisting of multi-ply cellulose wadding convolutely wound upon said tube and radially and axially compressed within said shell, a cover for said filtering body comprising a foraminate plate sealingly engaged around its periphery with the inside of said shell, the upper end of said tube being disposed through and upset upon said plate to axially retain the same against the compression of said filter body, a sheet of fabric on the upper end of said filtering body, a screen of woven fibrous material disposed between said foraminate plate and fabric, there being an outlet chamber between the upper side of said foraminate plate and said top for said shell open to said tube, and a gasket arranged between the bottom of said cartridge and said coupling and coacting therewith to close the lower end of said tube, said casing having an inlet opening positioned exteriorly of said cartridge shell.

2. In a filter, the combination of a casing provided with a discharge coupling at its bottom, a post carried by said coupling and having an outlet passage therein opening to said coupling, a filter cartridge comprising a shell having an imperforate side wall and a foraminate bottom, a top on said shell forming a central hole with an annular seal therearound coacting with said post, an imperforate tube surrounding and spaced from said post and having its lower end disposed through said shell bottom and upset in retaining engagement therewith, the post passage opening within said tube, a filtering body consisting of multi-ply cellulose wadding convolutely wound upon said tube and radially and axially compressed within said shell, a foraminate cover plate sealingly engaged around its periphery with the inside of said shell, the upper end of said tube being disposed through and upset upon said plate to axially retain the same against the compression of said filter body, there being an outlet chamber between the upper side of said foraminate plate and said top for said shell open to said tube, and a gasket arranged between the bottom of said cartridge and said coupling and coacting therewith to close the lower end of said tube, said casing having an inlet opening positioned exteriorly of said cartridge shell.

3. A filter cartridge comprising a shell having an imperforate side wall and top and a foraminate bottom, an imperforate tube having its lower end disposed through said shell bottom and upset in retaining engagement therewith, a filtering body consisting of multi-ply creped cellulose convolutely wound upon said tube and radially and axially compressed within said shell, a cover for said filtering body comprising a foraminate plate sealingly engaged around its periphery with the inside of said shell, the upper end of said tube being disposed through and upset upon said plate to axially retain the same against the compression of said filter body, a sheet of fabric on the upper end of said filtering body, and a screen of woven fibrous material disposed between said foraminate plate and fabric, there being an outlet chamber between the upper side of said foraminate plate and said top for said shell open to said tube, said top of said shell defining an aperture with a seal around the outside thereof, said aperture being of smaller diameter than said tube and aligned therewith to pass a post extended through said tube.

4. A filter cartridge comprising a shell having an imperforate side wall and top and a foraminate bottom, an imperforate tube having its lower end disposed through said shell bottom and upset in retaining engagement therewith, a filtering body consisting of multi-ply creped cellulose convolutely wound upon said tube and radially and axially compressed within said shell, and a foraminate cover plate sealingly engaged around its periphery with the inside of said shell, the upper end of said tube being disposed through and upset upon said plate to axially retain the same against the compression of said filter body, there being an outlet chamber between the upper side of said foraminate plate and said top for said shell open to said tube, said top of said shell defining an aperture with a seal around the outside thereof, said aperture being of smaller diameter than said tube and aligned therewith to pass a post extended through said tube.

WAYNE S. COOK.

REFERENCES CITED

The following references are of record in the file of this patent:

UNITED STATES PATENTS

| Number | Name | Date |
| --- | --- | --- |
| 860,720 | Adams | July 23, 1907 |
| 2,076,935 | Burckhalter | Apr. 13, 1937 |
| 2,110,009 | Weidenbacker | Mar. 1, 1938 |
| 2,188,923 | Robinson | Feb. 6, 1940 |
| 2,200,795 | Krieck | May 14, 1940 |
| 2,247,445 | Long | July 1, 1941 |
| 2,343,636 | Bentley | Mar. 7, 1944 |
| 2,347,384 | Winslow et al. | Apr. 25, 1944 |
| 2,348,651 | Schelly | May 9, 1944 |
| 2,413,556 | Fourness et al. | Dec. 31, 1946 |
| 2,427,733 | McCann | Sept. 23, 1947 |